(12) United States Patent
Wilkes

(10) Patent No.: US 7,912,590 B2
(45) Date of Patent: Mar. 22, 2011

(54) SOLAR POWERED INTERNALLY ILLUMINATED BILLBOARD

(76) Inventor: Travis Edward Wilkes, Norman, OK (US)

( * ) Notice: Subject to any disclaimer, the term of this patent is extended or adjusted under 35 U.S.C. 154(b) by 669 days.

(21) Appl. No.: 12/009,193

(22) Filed: Jan. 17, 2008

(65) Prior Publication Data

US 2009/0183405 A1    Jul. 23, 2009

(51) Int. Cl.
  *G06F 19/00* (2006.01)
(52) U.S. Cl. .......................................... 700/291
(58) Field of Classification Search .................. 700/291; 320/101; 40/543
  See application file for complete search history.

(56) References Cited

U.S. PATENT DOCUMENTS

| | | | | |
|---|---|---|---|---|
| 4,394,603 A * | 7/1983 | Widmayer | ..................... | 315/311 |
| 4,718,185 A * | 1/1988 | Conlin et al. | ................... | 40/442 |
| 5,818,734 A * | 10/1998 | Albright | ....................... | 700/306 |
| 5,925,986 A * | 7/1999 | Moisin | .......................... | 315/247 |
| 6,300,728 B1 * | 10/2001 | Blackburn et al. | ............ | 315/307 |
| 7,177,728 B2 * | 2/2007 | Gardner | ........................ | 700/295 |
| 7,654,684 B1 * | 2/2010 | Wight et al. | ................... | 362/183 |
| 2008/0295883 A1 * | 12/2008 | Ducellier et al. | ............. | 136/246 |
| 2010/0263248 A1 * | 10/2010 | Stadjuhar, Jr. | .................. | 40/605 |

OTHER PUBLICATIONS

"Economic Impacts of Advanced Weather Forecasting on Energy System Operations", Zavala et al, Mathematics and Computer Science Division of Argonne National Laboratory, 2009.*
"Grid-Connected Photovoltaic Systems with Battery Storages Control Based on Insolation Forecasting using Weather Forecast", Shimada et al, Renewable Energy, 2006.*

* cited by examiner

*Primary Examiner* — Michael D Masinick

(57) ABSTRACT

A sign frame having a rigid structure, the frame of which contains a mounting collar attached to a heat pipe extending vertically from the center of the lower horizontal member of the sign frame. An integrated solar heating means within the luminaire of the sign, and a means for timing the release of the stored heat to the fluorescent bulbs is provided. The internal illumination means for the sign includes a flexible vinyl sign face stretched over a the sign cabinet's rigid frame over, in which the flexible vinyl sign face material has sewn hems on all edges with inserted rigid rods and tension springs extended through the hems and hooked to the rods. The invention also provides a control method for determining the run time for loads utilizing solar power.

19 Claims, 9 Drawing Sheets

SOLAR POWERED INTERNALLY ILLUMINATED BILLBOARD

INCORPORATION BY REFERENCE

The related application, U.S. provisional patent application number 8581.001, filed on Jan. 19, 2007, by Travis Edward Wilkes, is hereby incorporated by reference in its entirety including figures.

BACKGROUND OF THE INVENTION

1. Field of the Invention

The invention relates generally to solar powered luminaires intended for illumination of billboards, outdoor signs and similar vertical surfaces and particularly to luminaires of increased efficiency capable of superior lighting intensities and uniform illumination of internally illuminated signs and billboards, in cold weather conditions, and with greater efficiencies due to a superior lode control method.

2. Description of the Related Art

The inventor is not aware of any design or invention that provides an internally illuminated solar powered display device of the type herein presented. Previous attempts have been limited to externally illuminated signage, such as U.S. Pat. No. 20040177538, or to small signs of the type used in residential real estate applications, house numbers, exit signs and the like, U.S. Pat. No. 20060265921, U.S. Pat. No. 20060162204, U.S. Pat. No. 20060021267, U.S. Pat. No. 20050030764, U.S. Pat. No. 20030103345 are examples. No previous effort has been made to provide internally illuminated billboard type signage that can be powered by solar photovoltaic modules and associated systems.

Face Tensioning Means Related Art. Means for mounting and/or framing flexible paper and synthetic sheet-like materials are known to the art. U.S. Pat. No. 2,212,313 teaches a display panel wherein a flexible, replaceable cover is mounted to a rigid rail at each longitudinal edge, and the longitudinal edges are wrapped around upright tubular structures and anchored to cross members by means of springs. U.S. Pat. No. 2,533,565 teaches a display frame for retaining a flexible display panel in a taut condition generally parallel to a backing board by means of spring clips along one edge and rigid clips along the opposite edge. U.S. Pat. No. 3,591,940 teaches a supporting frame for clamping flexible sheet materials, such as posters, to the frame means. The poster is fastened to opposite frame members by clamp means and a spring may be wedged between the frame members to provide the desired tension. U.S. Pat. No. 3,758,972 teaches a sign housing with a removable mounted sign panel wherein the edges of the sign sheet and a protective cover sheet are retained between nesting members of the panel frame. U.S. Pat. No. 3,830,278 teaches a modular canvas stretcher wherein canvas is fastened to the stretcher frame comprising rigid, mitered elongated members having longitudinal channels for retaining bracket members and bracing members. U.S. Pat. No. 4,233,765 teaches a peripheral framework for suspending flexible sheet materials over a central open area. The peripheral framework is provided with a channel for receiving a flexible strip member, by which the flexible material is engaged between the channel and the strip member.

U.S. Pat. No. 4,317,302 teaches a sign cabinet for outdoor signs comprising a support frame with clamp assemblies for retaining a flexible sign face under tension. U.S. Pat. No. 4,452,000 teaches an illuminated sign and framework housing, wherein a sheet of flexible, light-transmitting material extends across and covers an opening, and bolts secure a peripheral marginal portion of the sheet by adjustably tensioning the sheet across the opening. U.S. Pat. No. 4,372,071 teaches a fabric faced billboard wherein air pressure is applied from behind the fabric to smooth the fabric and provide a continuous, slightly curved display face.

U.S. Pat. No. 4,265,039 teaches a framework for suspending a fabric display face and a clamp assembly for selective adjustment of fabric tension. The '039 patent teaches that related art clamp assemblies required spaced holes to be punched in the fabric display through which bolts of the clamp assemblies were passed. The clamp assemblies were tightened around the fabric by means of a first nut, and the fabric was then tensioned by means of a second nut drawing the suspended clamp toward the mounted bracket. This system is undesirable from the standpoint that a plurality of holes are required in the fabric sign at prescribed intervals, and the fabric sign is prone to tearing during installation. In addition, multiple adjustments of the multiplicity of clamp assemblies to first tighten the clamp assembly around the fabric and then tension the fabric, is tedious and time consuming. The '039 patent teaches a fastening assembly having upper and lower support elements joined between corresponding opposite ends by respective side support elements. A hinge element is affixed to at least one of the support elements, and a hinge pin to which a marginal portion of the fabric is coupled may undergo limited rotation in conjunction with the hinge element to provide selective adjustment of the tension induced in the fabric.

U.S. Pat. No. 4,657,062 teaches an adjustable clamping system for tensioning and locking a flexible tarp. The '062 patent teaches a roll bar for fastening an edge of the flexible tarp to the clamping means.

It is evident from the above recitation of related art patents that the use of flexible sheet materials for outdoor displays and signboards is known, and that a variety of support structures and tensioning mechanisms has been proposed. None of the related art systems, however, provides satisfactory and selective tensioning of the flexible sheet-like material in combination with a simplified and convenient assembly technique.

PV Mounts Related Art. Previous efforts at providing a mounting system for solar photovoltaic modules have been characterized by two approaches; one: mounting modules on a flat surface, such as a roof, and two: mounting modules to a pole. The present invention is an improvement on the pole mounting systems, and more specifically the mounts known in the field as top pole mounts.

U.S. Pat. No. 4,265,422 and U.S. Pat. No. 5,011,105 teach a typical side pole mount for photovoltaic modules which is well known to the trade and in wide use today. U.S. Pat. No. 4,300,537 teaches a very complicated and expensive method for mounting solar modules atop a pole, as does U.S. Pat. No. 4,890,599. The present invention solves the expense and complexity problems inherent with theses approaches by simplifying the supporting frame to only two members and by integrating the mounting mast into the construction of the sign frame thus saving on cost and providing a means for carrying the wiring and such from the solar module to the interior of the sign frame.

Solar Heated Luminaires Related Art. The inventor is not aware of any effort to solar heat fluorescent bulbs in outdoor signage, although a great deal of work has been done to overcome the effects of cold starting in fluorescent bulbs utilizing other means.

Luminaires Related Art. Luminaires capable of internally illuminating vertical surfaces such as billboards and similar signs occupy a particular niche in the lighting field. Luminaires of this kind must operate in a harsh environment and be effectively impervious to the elements including rain, wind and heat. Prior luminaires developed for illumination of outdoor signs and the like have addressed the requirement that an illumination level of intensity sufficient to allow the sign being illuminated to be viewed with comprehension from varying distances must be provided. Prior luminaire have also addressed a second requirement that such signs be illuminated to desired levels on various portions thereof to provide a desirable impression of uniformity. Prior luminaires have addressed these two requirements as fully as technology existing at the time permitted. (See U.S. Pat. No. 5,188,453, U.S. Pat. No. 5,355,291, U.S. Pat. No. 5,588,742, U.S. Pat. No. 5,664,878 and U.S. Pat. No. 6,942,366 B2.) However, as energy conservation considerations have increased in recent times, a further requirement of such luminaires has been to direct as much light onto an outdoor sign so that a maximum amount of the generated light is actually used, full utilization of the generated light typically permitting lessened light generation for a given situation with a resultant conservation of energy. In the present marketplace, energy conservation must not result in a reduction in lighting intensity and uniformity.

Relatively more recent requirements relating to light "pollution" caused in part by light generated by luminaires that illuminate outdoor signs and the like have resulted in the necessity for the light generated by such luminaires be directed to the greatest degree possible onto the sign or billboard that is to be illuminated rather than "spill" about edges of such an outdoor sign, thereby producing stray light that accomplishes no function and acts to obscure the night sky. Light from such luminaires that is not focused onto the billboard or similar sign produces glare and clutter and effectively wastes energy through such inefficiency that the cost of such waste is estimated to exceed as much as one billion dollars on an annual basis. Spill light of this nature can negatively impact tasks performed near the location of an outdoor sign while contributing to "sky glow" and degrading the nocturnal environment so as to affect the quality of life in rural communities in particular as well as having a negative impact on business and recreational activities. The present invention solves this problem by internally illuminating the sign.

Solar Load Control Related Art. The inventor is not aware of any effort to manage the operation of energy using devices by including automated weather forecast data. The use of solar energy as a source of energy for various types of devices is well known in the art. The solar energy is collected during the daytime via a solar panel electrically connected to the energy storage device. The energy stored in the energy storage device is discharged to power the device. For example, a solar powered light utilizes solar energy as a power source to illuminate the light, and the available energy is stored in an energy storage device, such as a rechargeable battery.

Lighting control systems for outdoor signage are well known in the art. In the areas of controlling solar powered systems, including lighting applications, existing approaches have sought to develop improved circuitry to provide the most effective and efficient use of the solar energy. U.S. Pat. No. 5,196,781, U.S. Pat. No. 5,086,267, and others describe circuits to control the load portion of the system, U.S. Pat. No. 4,884,017, U.S. Pat. No. 5,635,816 and others describe circuits to control the charging function of the system. U.S. Pat. No. 6,037,758, U.S. Pat. No. 5,221,891, U.S. Pat. No. 6,914,411, and others attempt to improve the system by using improved methods to monitor and control both load and output functions.

In addition existing art recognizes the usefulness of remote control of the load, typically over wireless networks. U.S. Pat. No. 20070170870 and U.S. Pat. No. 20020154652 each address more sophisticated systems and methods for controlling loads in remote locations.

BRIEF DESCRIPTION OF THE DRAWINGS

The following detailed description when taken in conjunction with the figures presented herein provide a complete disclosure of the invention.

SUMMARY OF THE INVENTION

Figure 1:
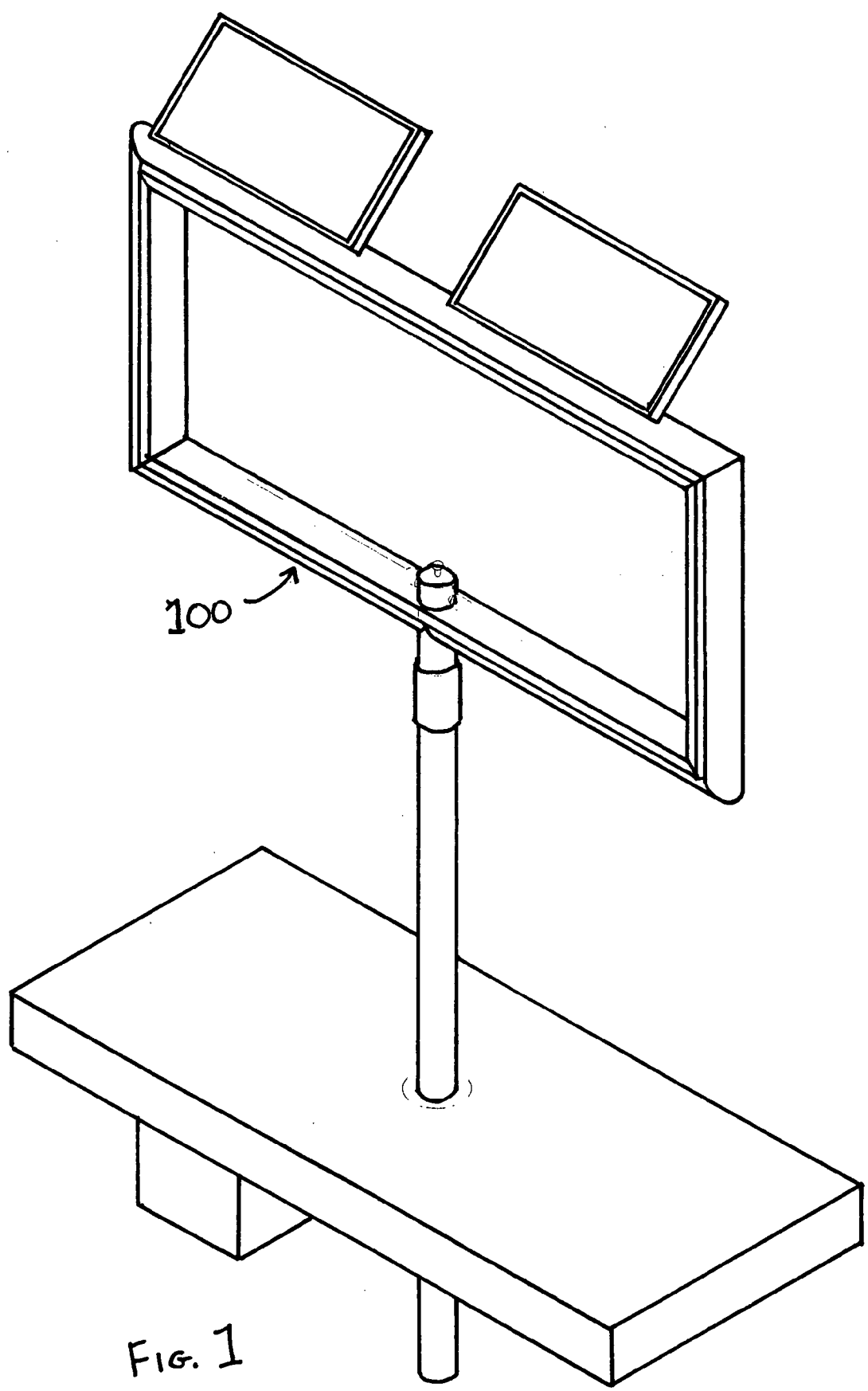
FIG. 1 shows a simple sign frame according to the present invention.

The present invention provides a sign frame having a rigid structure, the frame of which contains a mounting collar attached to a heat pipe extending vertically from the center of the lower horizontal member of the sign frame. An integrated solar heating means within the luminaire of the sign, and a means for timing the release of the stored heat to the fluorescent bulbs is provided. The internal illumination means for the sign includes a flexible vinyl sign face stretched over a the sign cabinet's rigid frame over, in which the flexible vinyl sign face material has sewn hems on all edges with inserted rigid rods and tension springs extended through the hems and hooked to the rods. The invention also provides a control method for determining the run time for loads utilizing solar power.

DETAILED DESCRIPTION OF THE INVENTION

It is an object of the present invention to provide a practical sign frame for solar powered internally illuminated outdoor signage and billboards.

It is another object of the present invention to provide sign frame with an integrated, simple means for attaching solar photovoltaic modules.

It is yet another object of the present invention to provide a sign frame that maximizes the utilization of limited illumination means.

The present invention builds on the approaches described in the foregoing paragraphs, and improves significantly the utilization of solar or other scarce and valuable energy resources through a new approach to managing load. In one embodiment of the invention run time for powering the load is calculated by means of an algorithm that combines user preferences, existing system capacity, and future solar recharging resources.

The sign frame element of the present invention comprises a cost effective means for the utilization of solar power in outdoor signage through the careful design and construction of the frame such that limited electrical add illumination means are maximized and wasted energy and light are eliminated.

The invention generally consists of a solar powered internally illuminated billboard comprised of a sign frame with integrated photovoltaic panel mounting means, a luminaire for effectively illuminating the sign faces, a means for providing solar heat to the lamps in cold weather conditions, a simple and efficient flexible face mounting and tensioning system, as well as a load management method for turning on and off the internal light sources.

The sign frame shall be constructed of four or more rigid members such that a clear span of unobstructed space is provided to present the advertising or similar material via "back lighting" of a secured and tensioned flexible face material. Integrated into this frame will be a plurality of attachments for the mounting of photovoltaic modules, which provide electrical power to illuminate the sign.

A plurality of mounting structures which provide secure and effective mounting of the photovoltaic panels to the sign and which allow for the correct orientation of said panels for azimuth and elevation. The entire structure and its parts comprise an improvement over existing solar powered signs both in quality of presentation and in efficiency of operation.

Sign Frame and Integrated Solar Module Mount

Sign Frame. In a preferred embodiment, the invention is comprised of a tubular steel frame with flange elements along the perimeter such that a luminaire is created integral to the frame, vertically protruding pipe like elements along the uppermost horizontal section of the frame providing mast to mount solar photovoltaic modules, and a transverse frame mounting collar assembly with integrated solar heating elements for affixing the frame to a vertical pole or metal pipe stanchion common in outdoor signage.

A frame for mounting and displaying material in outdoor applications where illumination or other uses for solar power are desired. The invention in several embodiments takes the form of a metal or other rigid material structure of a box like nature that provides the mounting frame for flexible vinyl or similar material to convey messages in an outdoor setting, such frame providing for integrated illumination fixtures, mountings for affixing solar photovoltaic modules to the frame, energy storage device connectivity, integrated solar luminaire heating system, means of controlling the storage and use of solar energy, and ease of maintenance features. This invention provides cheaper and simpler means for providing attractive outdoor signage.

Photovoltaic Module Mounting. It is another object of the present invention to provide an improved solar collector mounting structure. In accordance with the primary aspect of the present invention a solar collector mounting assembly includes a vertically extending column anchored at both its lower end and mid section to the rigid upper frame member of the sign, and having a formed bracket at the upper end for correct elevation and supporting a solar collector. Another aspect of the invention includes the construction of the column to define a wiring chase for electrical connection to the solar collection panels. A formed tubular dorsal brace is provided with a welded splayed leg assembly such that secure mounting of solar modules is possible on top of mounting masts integrated into the sign frame, such tubular brace also providing weather tight access for wiring and such from the solar module to the interior of the sign frame.

A solar photovoltaic module mounting device of sufficient strength and rigidity to secure standard solar photovoltaic modules of various manufactures to the sign frame utilizing mounting masts integrated into the frame itself, such masts and mounts providing secure anchorage for the solar modules in all weather conditions and wind loadings, weather tight accesses to the other elements of the device for wiring and such, and to provide preferred orientation of the solar modules in any geographic location. Thus reducing the cost and enhancing the utility of solar module mounting and orientation.

Figure 2:
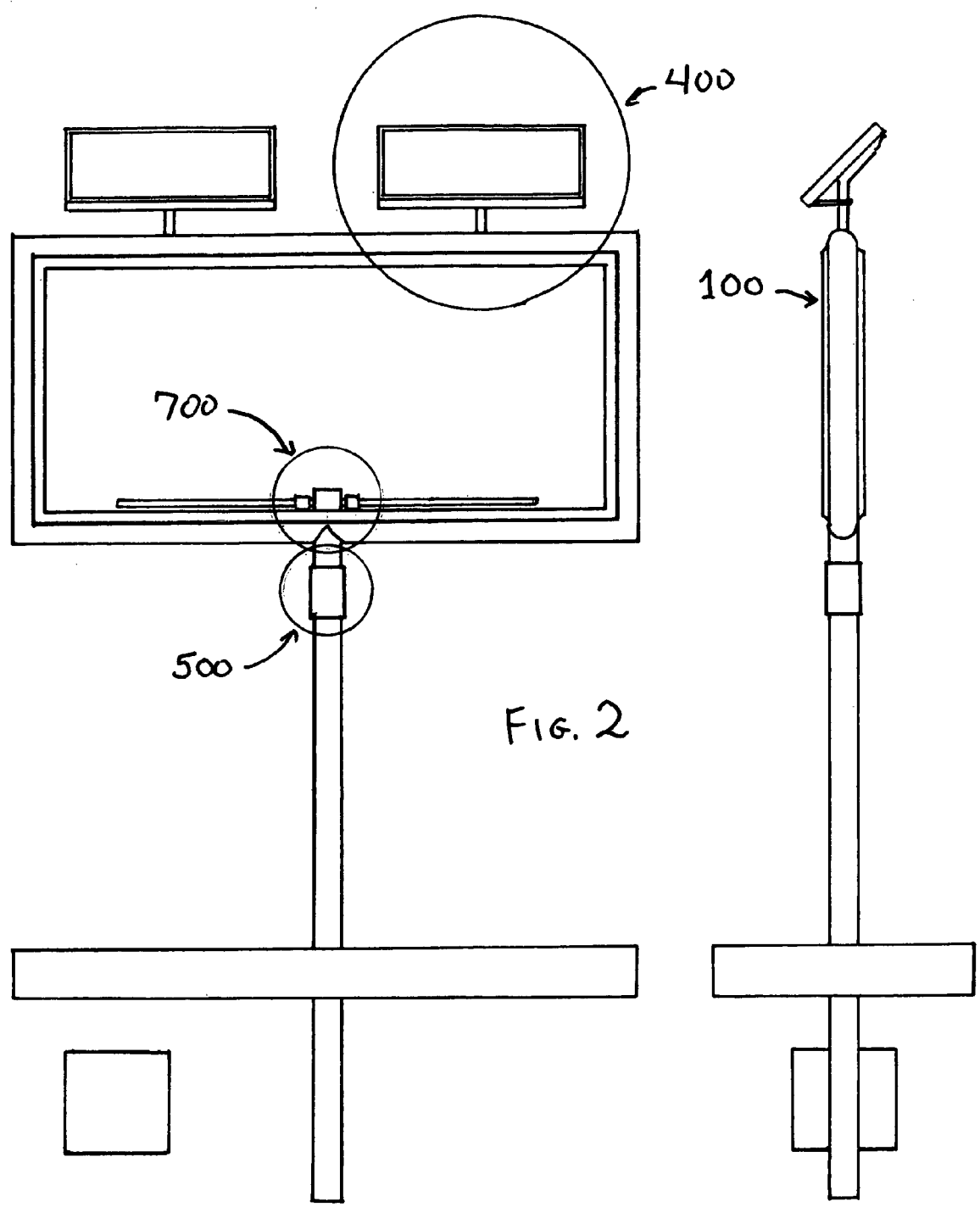
FIG. 2 provides more details of the frame's rigid structure.

FIG. 1 illustrates a simple sign fame (100) capable of providing pleasing outdoor signage in a style and size appropriate for billboards and the like that utilize solar energy for illumination. In FIG. 2, the frame consists of a rigid structure (1) of metal or other material of sufficient strength to create a clear span sign box. The frame consists of a steal tube welded into a rectangular form of a dimension to be useable for outdoor billboard applications such as what are known in the trade as eight-sheet billboards. The outdoor advertising industry is greatly controlled by sign codes that require strict adherence to defined dimensions and other aspects of the sign. The invention meets those requirements.

Figure 3:
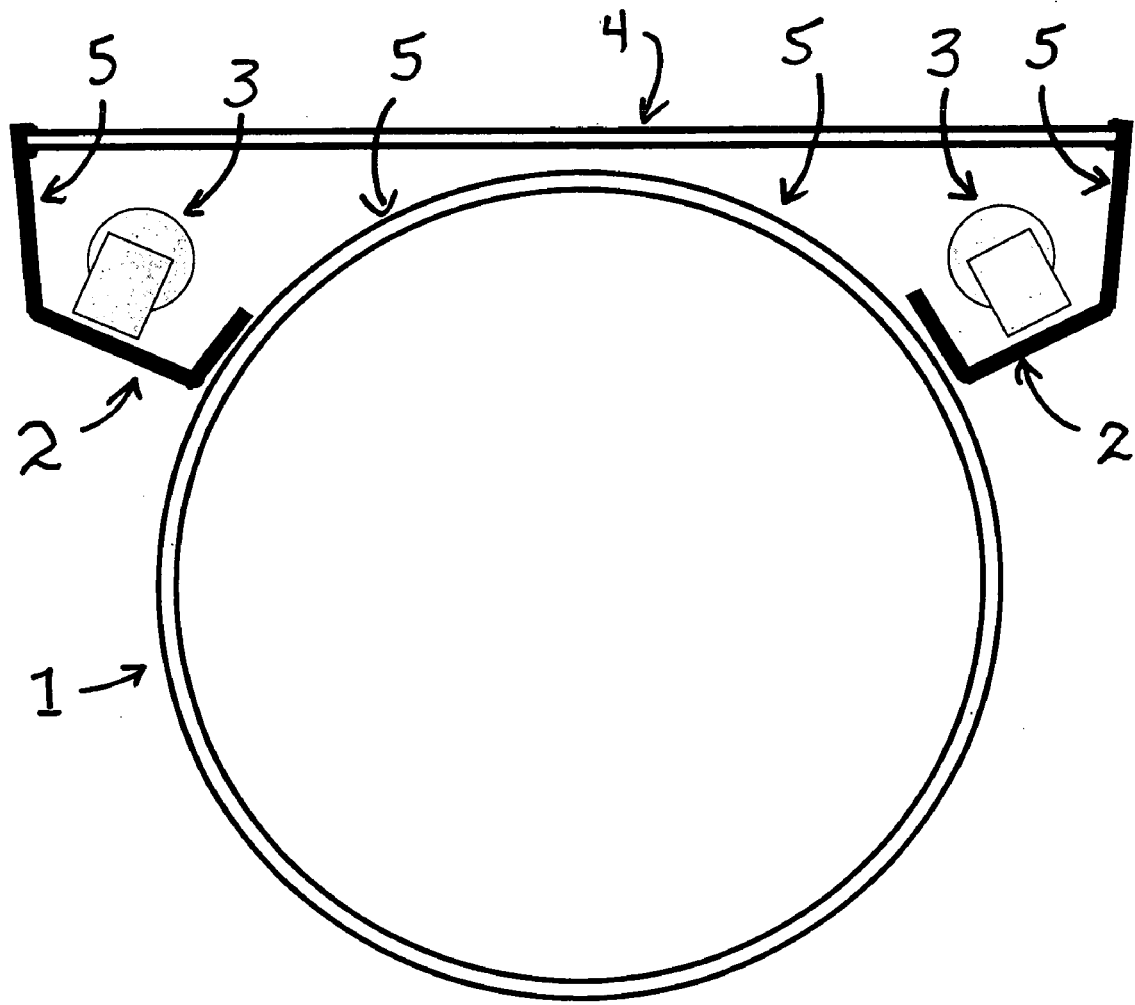
FIG. 3 represents a cross section of the lower member of the sign frame.

FIG. 3 represents a cross section of the lower member of the sign frame (1), illustrating the flange members (2) that are a part of the entire periphery of the sign frame. These flanges provide a mounting for the lighting means (3) as well as the luminaire's refractive and reflective surfaces (5). In some applications the lighting means is enclosed with a refractive and diffusing lens (4).

Figure 4:
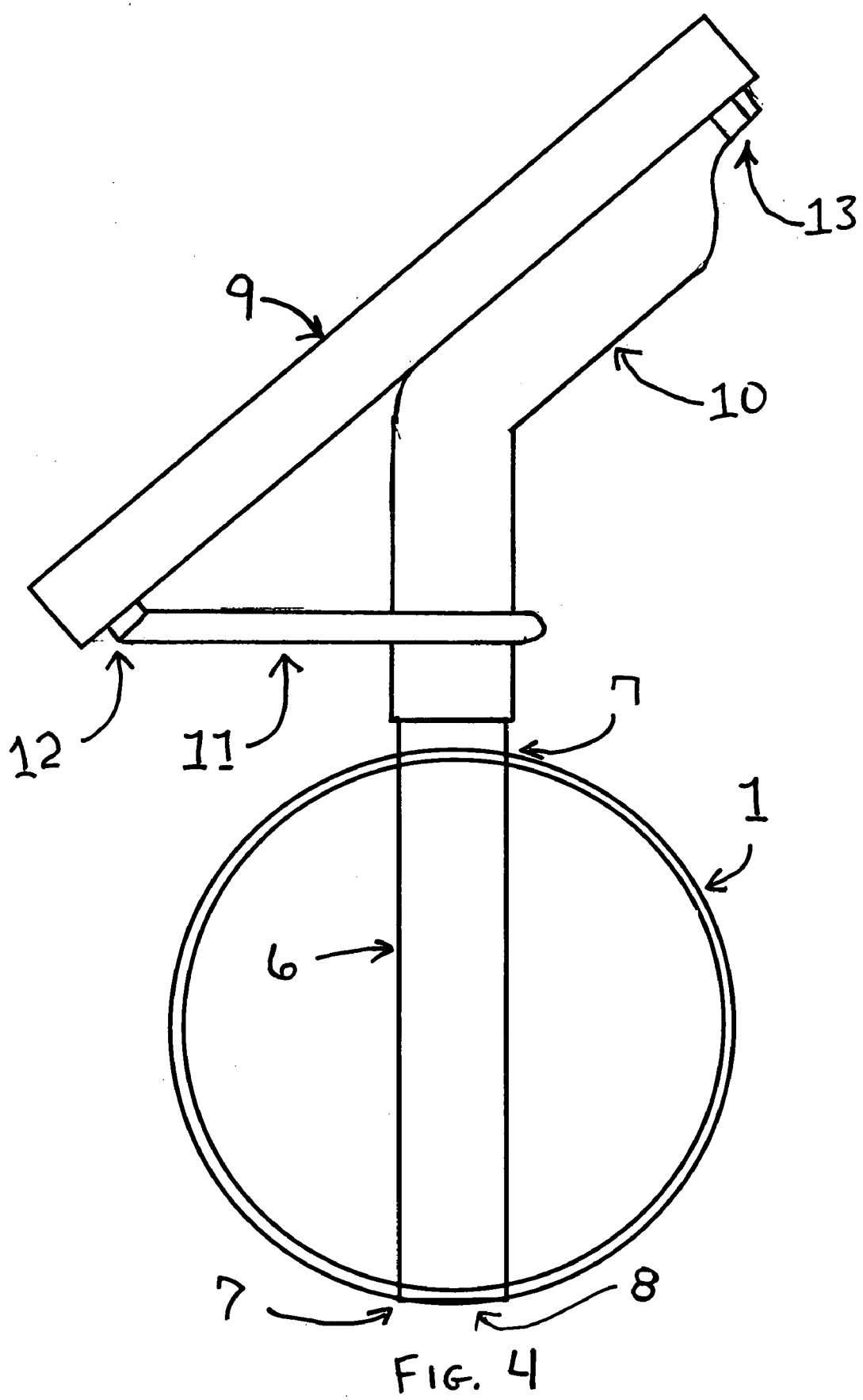
FIG. 4 illustrates a cross section of the upper horizontal element of the sign frame.

FIG. 4 illustrates a cross section of the upper horizontal element of the sign frame. Along the upper horizontal member of the sign frame (1) are placed one or more mounting "masts" (6) which act as the base for solar photovoltaic module mounts disclosed elsewhere in this document. These masts provide enhanced stability due to the double welding (7) of the mast through the tube (1) comprising the sign frame. In addition this innovation, along with the solar module mount, creates a weather tight wire chase (8) for the passage of electrical wiring and such from the solar photovoltaic module (9) to the interior of the sign box. The solar module mount consists of a formed tube (10), which slides down over the mast allowing the module and mount to be slewed to the correct azimuth for maximum solar energy production regardless of the orientation of the sign frame. A lower splayed leg member (11) is connected to the solar module (9) at two points along the lower portion of the module (12). The formed tube is likewise attached (13) to the center of the upper edge of the module.

Figure 5:
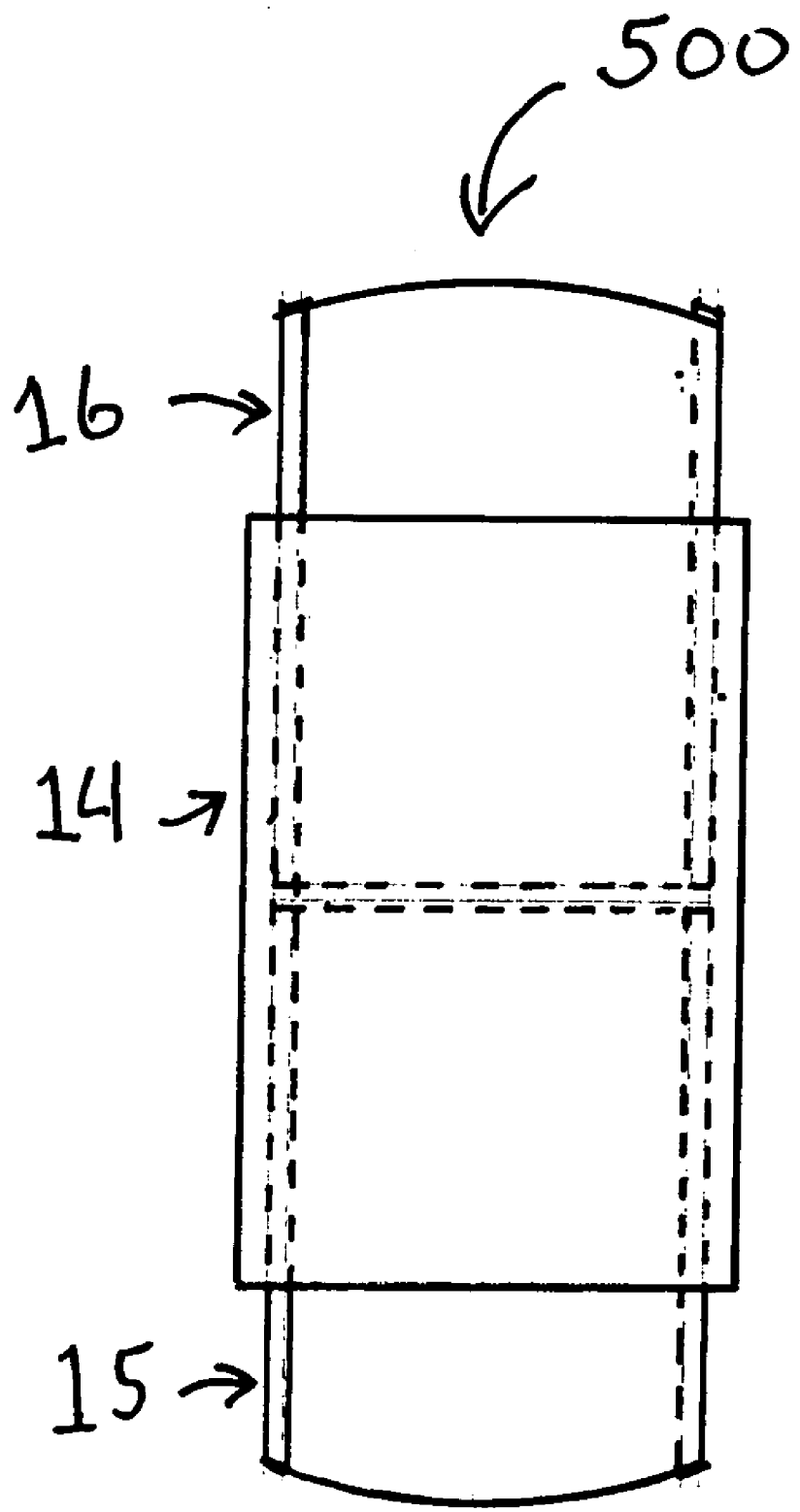
FIG. 5 depicts the frame containing a mounting collar attached to a heat pipe extending vertically from the center of the lower horizontal member of the sign frame.

Turning to FIG. 5, the frame contains a mounting collar (14), which is attached to the heat pipe (16), which extends vertically from the center of the lower horizontal member of the sign frame. This collar is for the purpose of mounting and attaching the sign frame to the vertical sign pole (15), said collar sized so as to slide snugly over the vertical pole and with attachment means of various designs for securing the sign frame to the pole.

Efficiencies occasioned by the present fixtures permit illumination of billboards and similar signs of standard dimensions with fewer light sources using less energy while still providing full and even illumination of the sign faces. In addition, the peripheral luminaires form a light tight "sign box" which frames and defines the advertising material displayed by the sign as well as eliminating "spill light" pollution.

Face Tensioning Means

Tensioning springs, hooked around rods nested in seams on all four sides of a flexible vinyl sign face, and tubular sign frame members provide a simple means for mounting flexible faces to outdoor signs.

It being desirable to present material in a pleasing and attractive manner on outdoor signs and the like a means for affixing and maintaining flexible vinyl printed faces is provided utilizing elements of the sign frame and spring devices to place and keep advertising material and such in a taunt and secure manner in all weather conditions and wind loadings as may be encountered. This provides a simpler and less costly method for mounting faces on internally illuminated signs.

Figure 8:
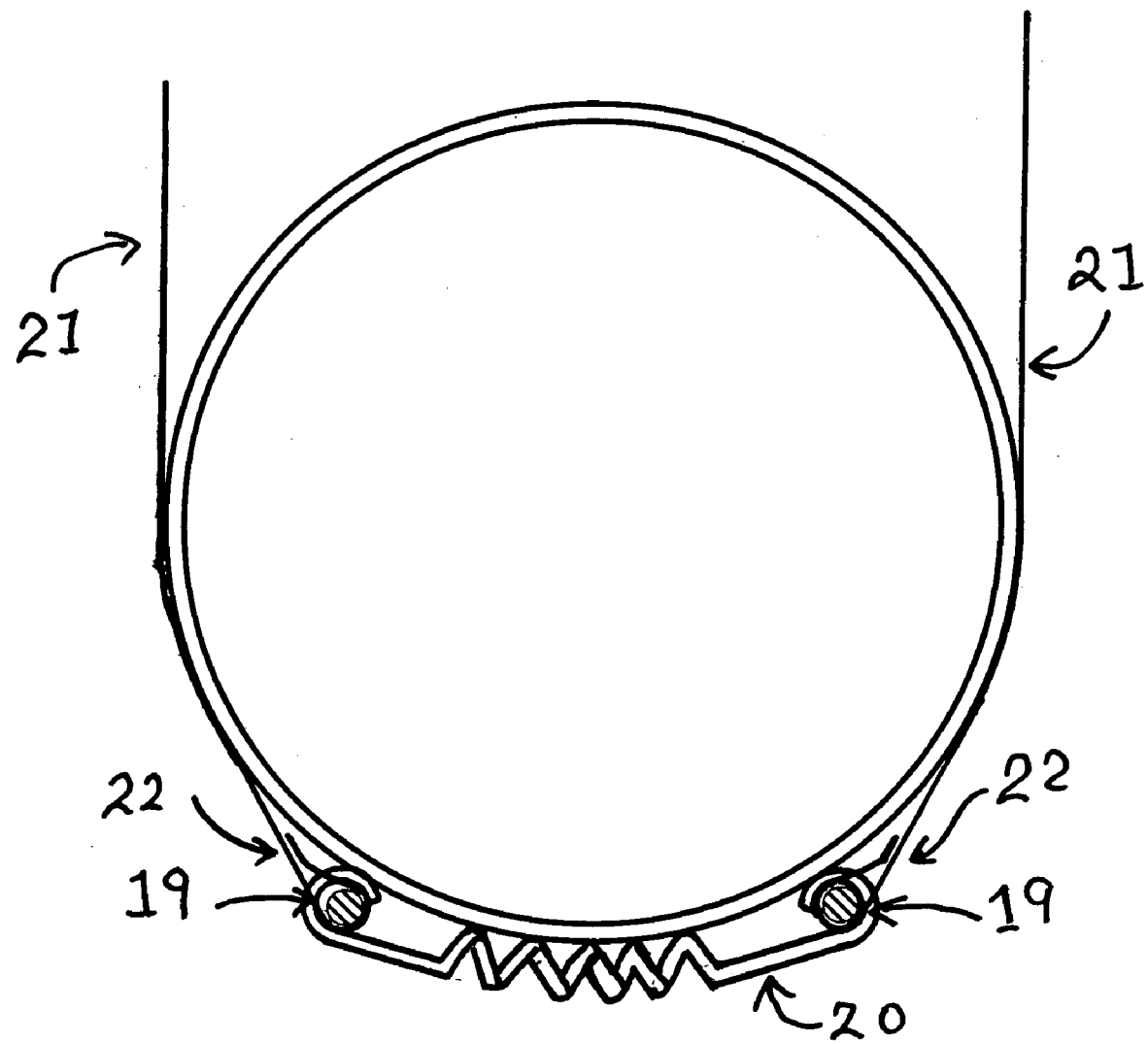
FIG. 8 shows internal illumination means for the sign, including a sign cabinet having a rigid frame over which a flexible vinyl sign face is stretched, in which a flexible vinyl sign face material has sewn hems on all edges with inserted rigid rods and tension springs extended through the hems and hooked to the rods.

FIGS. 2 and 8 illustrate an internally illuminated sign, which includes a sign cabinet having a rigid frame over which a flexible vinyl sign face (21) is stretched. The flexible vinyl sign face material has sewn hems (22) on all edges. Rigid rods (19) are inserted in the hems, and tension springs (19) are extended through the hems and hooked to the rods. The springs are similarly hooked to the opposite sign face hem and rod, which extend along all sides of the face frame. The springs hold the sign face hold the face taut on the sign frame.

The present invention relates to a tension mounting system and assembly whereby a flexible sheet material may be suspended in a taut condition from a generally planar support surface. The mounting system and assembly of the present invention is particularly suitable for use in signs displaying advertising material, such as billboards, signboards, real estate signs, political signage, and the like. (See U.S. Pat. No. 3,977,111 and U.S. Pat. No. 4,372,071.)

Display signs have been used for a variety of purposes and in a variety of applications, typically for promoting a business or a product. Conventional billboards generally comprise a planar rigid support surface, or a plurality of such surfaces mounted adjacent one another, upon which the advertising message is painted. Alternatively, the advertising material may be painted or printed on paper or another sheet-like material which is then affixed to the planar rigid support surface, typically by means of adhesives. In many cases, the billboard comprises a freestanding structure mounted on the ground or on a building or the like, and it may be illuminated by spotlights, or the like, to provide visibility during the nighttime. In some cases, advertising material is applied directly to the surfaces of a building structure itself because the building structure cannot support the weight of a billboard support structure. These types of conventional billboards are very expensive to erect and maintain. The appearance of conventional billboards is also apt to deteriorate rapidly due to weather conditions such as sun, precipitation, changes in temperature, and the like.

Signs comprising a substantially rigid sheet of transparent or translucent material upon which an advertising message has been applied have also been utilized, generally by mounting them in a cabinet and illuminating the sheet material bearing the advertising message from inside the cabinet. These types of display signs generally exhibit less deterioration due to weather conditions, but the size of the display sign is quite limited, since transport and installation of a large, substantially rigid sheet is impracticable. In addition, these materials exhibit at least some resiliency, which limits the practical dimensions of the sign, and tends to result in distortion or bowing of the sign due to the weight of the material and due to adverse weather conditions, such as high winds.

Recent innovations in the advertising industry include the use of a flexible, fabric-like sheet material which is light, relatively impervious to weather, and may be illuminated from behind to provide an attractive and effective display. This material is preferably suspended in a taut condition to provide a planar display surface. The costs associated with installation and maintenance of display signs comprising a flexible sheet material are generally less than those associated with conventional signboards and billboards, since the advertising message may be applied at a central location, and the sheet material may be rolled or folded for convenient transport to the display location.

It is an objective of the present invention to provide a simplified tension mounting system and assembly wherein a flexible, sheet-like material may be suspended in a taut condition from a generally planar support surface and selectively tensioned by a plurality of spring means which connect to each face of the two faced sign.

It is another objective of the present invention to provide a tension mounting system and assembly which facilitates installation and removal of flexible, sheet-like materials without requiring disassembly of complex mounting brackets.

It is yet another objective of the present invention to provide a tension mounting system and assembly for suspending a flexible sheet material in a taut condition which is versatile and may be adapted to a variety of sign sizes, weights and designs.

The tension mounting assembly of the present invention comprises a flexible, sheet-like material with a retaining means extending around its peripheral edges, and a plurality of spring means fastened to a generally planar support surface and arranged along all opposite edges of the flexible, sheet-like material, each spring means adapted to engage the retaining means and provide selective tensioning of the flexible sheet-like material by the nature of the spring means. The tension mounting system and assembly of the present invention is especially preferred for use in display signs and billboards for exhibiting an advertising message, but may also be used in any application where suspension of a flexible sheet material in a taut condition is desired.

Solar Heated Luminaire

The invention also improves the operation and application of fluorescent bulbs in outdoor applications by heating the lamp prior to ignition, thus solving the problem of cold temperature starting.

A device and method for collecting solar radiation during daylight hours, converting that radiation into useable heat, and a means for controlling and distributing that heat to vital elements of the lighting fixture during periods of cold temperatures in order to solve the problem of cold starting on the fluorescent bulb lamps that illuminate the sign.

A known problem with outdoor lighting applications is the effect of cold temperatures on the starting and operating properties of fluorescent bulbs. In winter ambient temperature conditions common in most parts of the country the fluorescent bulbs require more electrical current to ignite and run. Energy that could go to illumination is lost to heating the filaments in order for the bulb to properly function. In addition light output is reduced in cold conditions resulting in the sign failing to be pleasantly illuminated. The present invention solves this problem by heating the fluorescent lamps with solar heat prior to start up.

Figure 6:
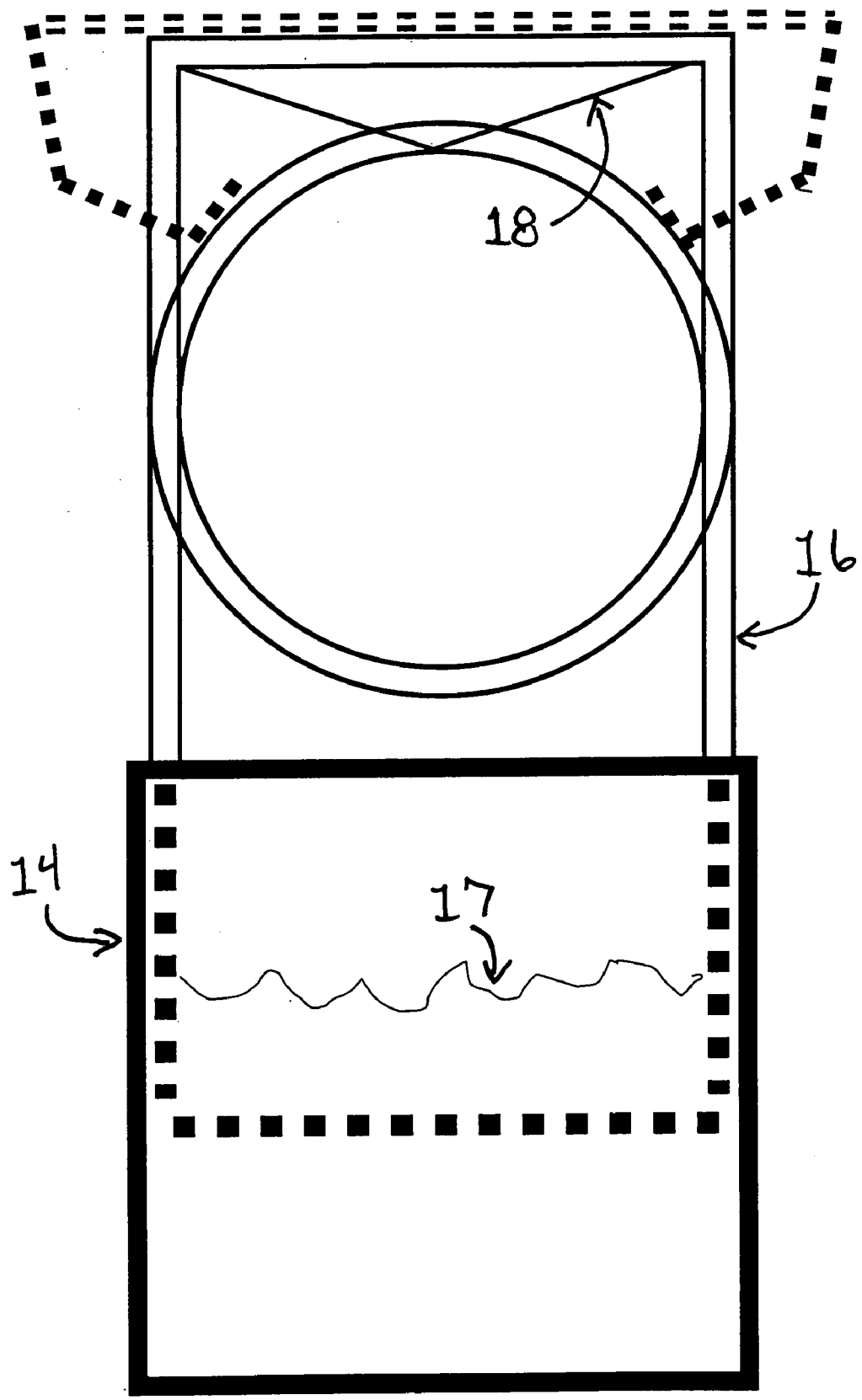
FIG. 6 illustrates an integrated solar heating means within the luminaire

FIG. 6 illustrates the invention as in its preferred embodiment consists of an integrated solar heating means within the luminaire. In the current embodiment a sealed canister (16) is provided such that when solar radiation strikes the selectively coated surface of the solar collector assembly (14) heat is absorbed and transmitted to the canister and the working fluid (17) of appropriate properties. This fluid is maintained at greatly reduced atmospheric pressure in the evaporator region of the heat pipe assembly, resulting in the fluid "boiling" at relatively low ambient temperatures. This "phase change" from a liquid to a vapor transfers energy in an efficient and effective manner. The resulting vapor by its nature rises in the canister to the highest point, which is arranged adjacent to and within the confines of the fluorescent lamp fixture. Having arrived at the fixture the vapor condenses, giving off the stored energy in the form of heat to the fluorescent fixture and the associated fluorescent bulbs. Upon condensation the vapor returns to a liquid form. The invention utilized a unique condensation "funnel" (18) within the canister to gather and direct the fluid. Having condensed into a liquid once again the fluid is drawn by gravity to the bottom of the canister and repeats the cycle of vaporization and condensation, continuously transferring heat energy from the solar absorber to the fluorescent fixture.

Figure 7:
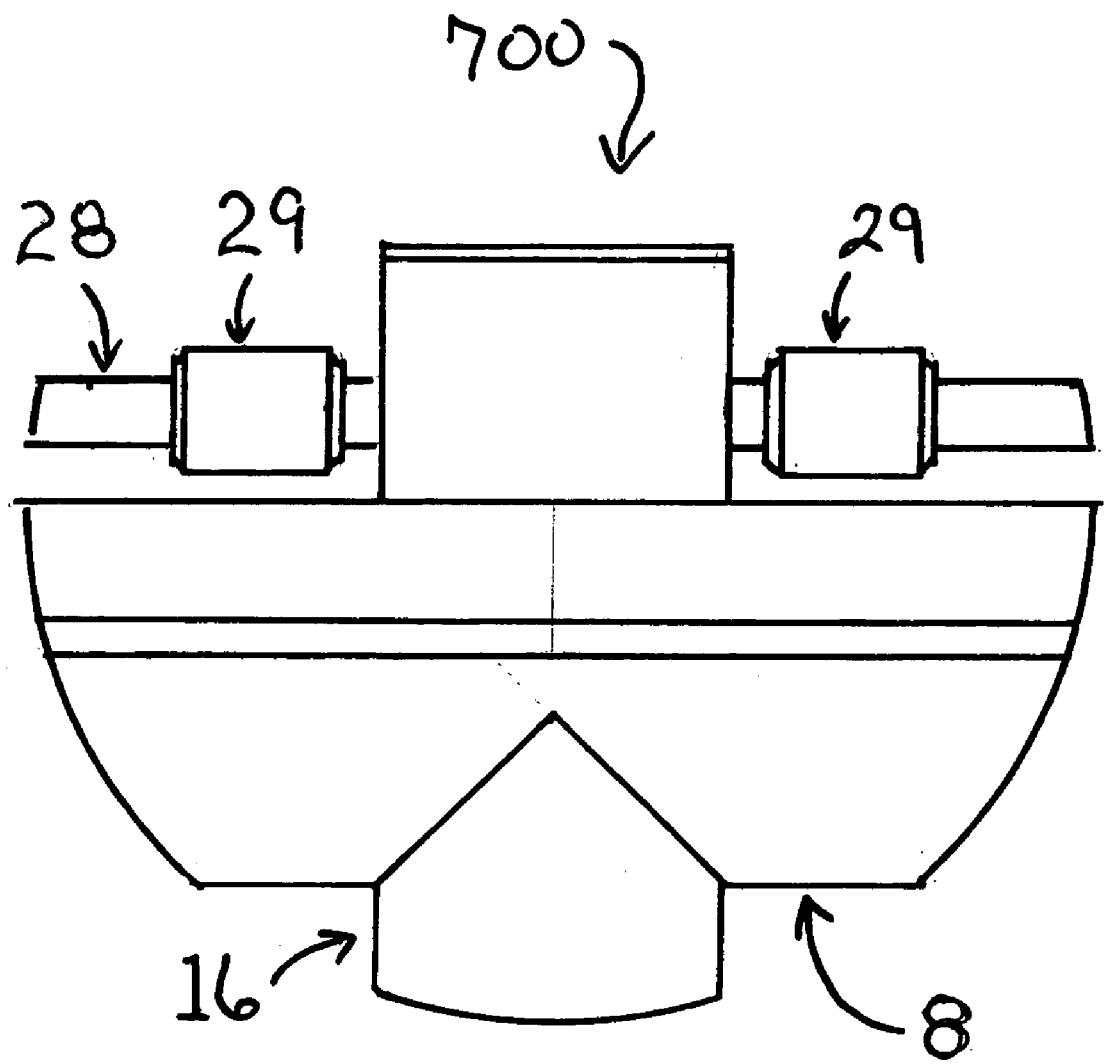
FIG. 7 illustrates a means for timing the release of the stored heat to the fluorescent bulbs.

FIG. 7 illustrates yet another embodiment of the invention comprises a means for timing the release of the stored heat to the fluorescent bulbs. This is accomplished by utilizing the timer or other control mechanism that turns on the lights at dark. These means are programmed to first activate a server valve (29) controlling the transmission and dissipation of the solar heat to the fluorescent bulbs through laterally extending dissipation tubes (28), thereby effecting greater efficiencies than would otherwise be possible.

Following a day of even moderate solar radiation this method provides sufficient heat energy to ameliorate the negative effects of the cold ambient temperature on the operation of the sign lighting system.

In one embodiment of the invention such fluorescent bulbs are utilized for illumination of the sign. In order to overcome the known negative effects of cold weather conditions this invention provides solar radiation heating for the fluorescent bulbs, particularly during the important ignition phase of their operation. This solar heat thus provided maintains the bulbs at an acceptable working temperature thus reducing the negative effects of cold temperatures in the sign's normal working environment.

U.S. Pat. No. 6,300,728 teaches us that a fluorescent light requires a unique power supply that heats the electrode only temporarily to achieve electron excitation of the mercury vapor. The ballast balances the inrush current in combination with a high voltage required for gas excitation. These power supplies require careful attention to design, and add an additional cost. One advance of conventional tube-type fluorescent lighting systems provides quick starting. According to one form of improvement, known as "preheat", the cathode electrodes are preheated when first turned on. When the starter switch opens, the current arcs through the tube, keeping the cathode electrodes hot. According to another form of improvement, known as "instant-start", there is no starter switch and the cathode electrodes are short circuited. A high voltage (for example 500 volts) is applied at the start of the fluorescent light. The high voltage induces illumination, and the ballast returns the voltage to operating levels. According to yet another form of improvement, known as "rapid-start", there is no starter switch, but the cathode electrodes are not short circuited. Special windings in the ballast provide preheat of the cathode windings, and the fluorescent light is started by a high voltage as in the instant-start modality.

U.S. Pat. No. 4,067,315 teaches us that a heat pipe is useful means for converting solar energy into thermal energy. Such devices comprising an envelope provided with an evaporator region and a condenser region, a quantity of vaporizable working fluid within the envelope, and a fluid return means within the condenser area of the pipe. The evaporator region of the heat pipe is made from a material which is substantially transparent to radiation in a selected range of the solar spectrum. Solar energy is thereby converted into thermal energy or heat directly within the canister, and the heat generated causes portions of the working fluid therein to evaporate.

It is one object of the present to provide solar heat to the flourescent lamps in outdoor signage in order to overcome the harmful effects of cold temperature starting inherent in this technology, thus making energy efficient flourescent lamps a viable alternative in more kings of applications.

Another object of the invention is to provide a control mechanism for the timely dispensing of the solar heat to the flourescent lamps just prior to their start up, thus maximizing the benefits of the solar heating system.

Luminaire

A lighting fixture means for internally illuminating billboards or similar signs. The invention improves previous attempts by making the entire sign frame a light fixture with reflective and refractive elements to evenly scatter the light throughout the sign cabinet, thus reducing the number of lamps needed to illuminate the sign.

The lighting fixture means for internally illuminating billboards or similar signs. The invention in several embodiments takes the form of primary reflector structures capable of directing light from a light source disposed within a portion of said fixture either directly to the vertical surface or to refractive structures located on the fixture for redirection of light to the vertical surfaces. The primary reflector structures of the invention are curvilinear in conformation and extend for the entire periphery of the sign circumference, the reflector structures being contoured or formed into a plurality of reflective segments. The primary reflector structures are preferably complemented by side reflectors of either flat, curved or faceted conformation that act to direct incident light directly onto the vertical surfaces or to refractive structures for redirection onto the vertical surfaces. Thus, the entire perimeter of the sign becomes the luminaire reducing the cost and improving the effectiveness of existing approaches.

The invention in several embodiments takes the form of primary reflector structures capable of directing light from a light source disposed within a portion of said fixture either directly to the vertical surface or to refractive structures located on the fixture for redirection of light to the vertical surfaces. FIG. 3 illustrates a cross section of the sign frame. The primary reflector structures (5) of the invention are curvilinear in conformation and extend for the entire periphery of the sign circumference, the reflector structures being contoured or formed into a plurality of reflective segments. The primary reflector structures are preferably complemented by side reflectors of either flat, curved or faceted conformation that act to direct incident light directly onto the vertical surfaces or to refractive structures for redirection onto the vertical surfaces. The reflector assemblies of the invention are mounted within the confines of the double-faced sign or billboard, FIG. 2, the refractive structures conveniently being disposed on or formed integrally with a rigid frame that completes the sign structure. Efficiencies occasioned by the present fixtures permit illumination of billboards and similar signs of standard dimensions with fewer light sources using less energy while still providing full and even illumination of the sign faces. In addition, the peripheral luminaire form a light tight "sign box" which frames and defines the advertising material displayed by the sign as well as eliminating "spill light" pollution.

In the several embodiments of the invention explicitly disclosed herein, the invention provides luminaire intended for illumination of internally illuminated billboards and outdoor signs which are capable of uniformly illuminating surfaces of said signs with desired intensity over full surfaces of said signs. The luminaire of the invention provide improvement over the related art by the provision of highly efficient primary reflector structures comprising the periphery of the structure of the sign. In some applications, this luminaire is sealed against environmental affects by means of a transparent lens (4) that also functions as a cover. The lens is formed with refractor elements preferably disposed on surfaces of the lens disposed interiorly of the housing. Refractive elements may be provided only on portions of the lens and take the form of prisms of differing configuration selected for redirecting light from portions of reflective surfaces of said luminaire to illuminate particular portions of an outdoor sign. Refractive prisms formed on the transparent luminaire lens refocus direct light from both the light source and the reflector assembly to increase uniformity of illumination.

Primary reflector structures configured according to the invention essentially take the form of compound parabolic elements formed of smoothly curved sections or reflective segments (5). Portions of said primary reflectors can be formed of or surfaced with reflective metals or paints having differing optical characteristics such as diffuse, semi-diffuse and specular reflective characteristics. Use of reflector surfaces having such characteristics allow light to be reflected to form virtual images of the light source distributed over surfaces of the sign with a resultant increase in sign illumination intensity and uniformity of illumination.

Refractive prisms formed along an uppermost portion of the lenses act to reduce up-spill light by redirecting light onto top edges of a sign. Prisms located at the bottom portion of the refractor reduce down-spill light by lifting light that would otherwise spill toward bottom corners of a sign.

Efficiencies occasioned by use of the present luminaire permit the use of fewer light sources for adequate illumination of signs of predetermined dimensions. Accordingly, it is an object of the invention to provide luminaire intended for illumination of billboards, outdoor signs and the like and which are capable of providing uniform light distribution over full surfaces of said billboards without spillage of light about edges of said billboard.

It is a further object of the invention to provide a luminary intended for mounting on the periphery of a large panel such as a billboard for illumination of said panel, the luminaire being formed of a housing, a light source disposed within the housing (3), a plurality of primary reflectors affixed within the interior of the housing for directing light from the light source both directly to surfaces of the panels to be illuminated and to refractive prisms preferably disposed on interior surfaces of a covering lens completing the housing and transparent to light emanating from the light source, from the primary reflector and from side reflectors associated with the primary reflector, the reflective surfaces and the refractive prisms acting to focus light from the light source onto surfaces of the panels with desirable intensity and uniformity and with reduced light spillage.

Yet another object of the invention is to provide a sign lighting luminaire having refractive areas of both prismatic and non-prismatic characteristics disposed on a transparent cover (4) and preferably internally of said cover, these refractive elements being formed in sections disposed at varying locations of the cover and orientations for acting with reflective surfaces of the luminaire to direct light onto a billboard or the like with desirable illumination intensity and uniformity while reducing light spillage.

Still another object of the invention is to provide an outdoor sign illumination system capable of evenly and efficiently illuminating a billboard or the like through the use of Light Emitting Diodes (LEDs) as the light source. In this embodiment, the individual light sources are distributed throughout the periphery of the sign box, therefore delivering pleasant and even illumination of the faces of the sign with significant savings in power demands and with greatly increased life of the lighting sources. In addition, the LED application realizes superior performance in cold weather application verses fluorescent light sources.

Yet another object of the invention is the utilization of a lense as specified above that additionally creates a thermally closed container for the lamps thus fully utilizing the solar heat system described herein.

Control Method

Existing systems for controlling solar devices rely on guesses or estimate about how much sunlight will be available to re-charge the batteries in these devices. Therefore the load must also be set by an estimate of what power resource will likely be available. In addition, all of the existing load control systems are designed to be installed at the location of the device, making changing the settings on these devices a labor intensive and daunting prospect for anyone with tens or even hundreds of solar powered devices or systems, particularly those located remotely from the place of business of the owner of these devices. The present invention solves these problems by providing future solar radiation data via an Internet connection to a computing device that determines daily load by combining owner preferences with current usage and future recharging resources to better utilize precious solar energy resources. In another embodiment of the invention the method manages the energy use of devices and systems in a building, such as lighting, heat, cooling, and the like, by integration future weather data into the use calculations for those systems and devices, even when energy storage is not utilized.

An improved method for managing energy use for both solar powered and conventionally powered devices and systems using weather forecast data. In the preferred application for turning on and off a solar-powered device using solar radiation forecast data. This method can greatly increase the efficiency and usefulness of solar-powered systems and devices by calculating the on and off times of individual loads based on actual weather conditions rather than general averages and assumptions, as is now the standard practice. In addition, this method greatly increases the usefulness of the solar powered device or system by providing means for managing utilization at a central location, rather than at each individual device or system Existing systems for controlling solar devices rely on guesses or estimate about how much sunlight will be available to re-charge the batteries in these devices. Therefore the load, for example the run time for solar powered signs, must also be set by an estimate of what power resource will likely be available. Common practice is to over size the solar array and the battery capacity in order to avoid the battery being fully discharged and the sign not lighting. Many existing controllers for solar-powered signs have a "low voltage" circuit that will disconnect the battery from the load should the battery voltage drop below a certain point.

Current solar system design methods require that the designer decide beforehand (1) how many hours the device will be powered, guess at (2) how many days might go by without sunlight to recharge the battery, and (3) use an average of "hours of available sunlight" in order to size the solar array. All of these steps tend to make the resulting solar power and lighting system over sized and underutilized, adding significant cost to the product.

Some existing solar-powered sign controllers offer a variety of "on and off" choices, such as: a set run time each night beginning at sunset, a set run time each evening and another run time prior to dawn. Others simply allow for a fixed run time with the light being turned on either by time of day or a sensor method for detecting darkness.

In addition, all of the existing load control systems are designed to be installed at the location of the device, making changing the settings on these devices a labor intensive and daunting prospect for anyone with tens or even hundreds of solar powered devices or systems, particularly those located remotely from the place of business of the owner of these devices.

The present invention provides a superior method for determining the run time for loads utilizing solar power. By utilizing actual weather data on a real time basis and calculating the appropriate run time accordingly, the solar power system delivers more hours of power with less expensive equipment.

Figure 9:
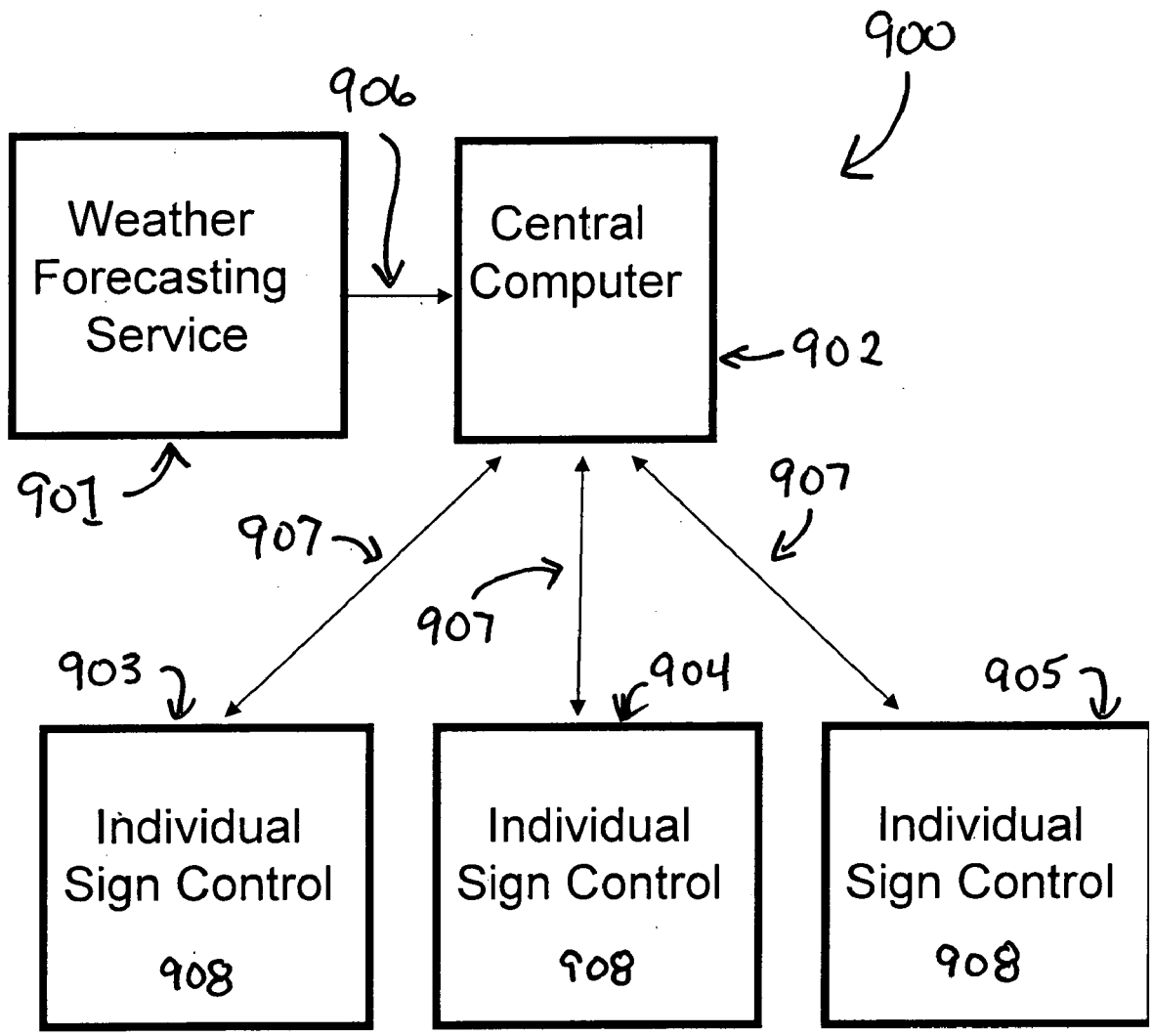
FIG. 9 illustrates a control method for determining the run time for loads utilizing solar power.

FIG. 9 illustrates a control method (900) according to the present invention. A weather forecasting service (901) provides automated solar radiation and other weather data via an Internet connection (906) to central computer (902). The computer utilizes a software application, which calculates the management of the load or loads for the devices individual control switches (903-905) via a wireless or wired connections (907). In yet another embodiment of the invention, sensors (908) measure system element status, such as battery charge level and the like, for transmission to the central computer (902) such data being included in the load management calculations.

In one embodiment of the invention a computer with Internet access is located at the business office of the outdoor advertising company. The computer is linked to a service provider. Daily forecasts of available solar radiation are sent to this computer over the internet. The computer is loaded with a software program that utilizes both the recent history of battery discharge for each sign or device and the forecast for future sunlight over the next few days. The program calculates each day the on and off times or each individual solar-powered billboard, sign, or other solar power application. It does so based on the preferences of the owner of the sign or device and the capacity of the system on that specific day. The computer then sends a radio signal to each sign at the determined "turn on time" and again at the determined "turn off time".

Previous efforts at controlling the use of solar energy resources have failed to take into account the precise availability of solar radiation. U.S. Pat. No. 5,196,781 uses a circuit to limit damage to the battery from over discharging. U.S. Pat. No. 5,086,267 and U.S. Pat. No. 5,635,816 simply reveal an improved circuit to control the charge current to the battery. U.S. Pat. No. 6,037,758 attempts to improve on load control, but is intended only for systems connected to grid power resources and fails to solve the problem of most efficient use of stand-alone solar power devices.

Others have sought to improve on the utilization of solar energy through the utilization of timing devices to turn the load on and off. U.S. Pat. No. 2002154652 is an example. No one however has sought to provide future solar radiation data and to use this data in determining load run time. This invention does just that.

The invention solves a number of problems associated with the use of solar photovoltaic power systems, and more specifically remotely located systems, particularly when there are multiple devices being utilized. The Outdoor Advertising Company, for instance, can manage the utilization of multiple billboards from a central location. The software that determines load run time also creates records of the run times of all such billboards in the company's inventory which are useful to the operations of the company.

Individual billboards or groups of billboards can be programmed to run according to the wishes of the specific advertisers displayed on those billboards. The "showings" of any individual billboard, or group of billboards, can be easily changed according to the wishes of the changing advertisers.

The method makes maximum utilization of the solar resources and does not waste capacity. This allows the designer of these solar-power systems to reduce the size and capacity of expensive equipment. Solar photovoltaic module capacity can be reduced by 20% and storage battery capacity by 75% using this method, thus realizing significant savings in the cost of solar power applications.

CONCLUSION

Reasonable variations and modifications from the exemplary embodiments of the invention set forth herein are possible without departing from the spirit and scope of this invention. The scope of the present invention should be determined by the following claims.

What I claim is:

1. A solar powered, internally illuminated, solar heated sign system comprising:
    (a) a frame sufficient in size and dimension to display graphic material;
    (b) a lighting means configured to illuminate said graphic material;
    (c) at least one photovoltaic solar module configured to charge at least one battery, said battery being configured to power said lighting means under selective control;
    (d) a tensioning means configured to affix graphic materials to said frame;
    (e) an integrated solar lamp heating means configured to heat said lighting means; and
    (f) a remotely located load management computer system configured to control said lighting means and said heating means and further comprising:
        (i) a means for receiving a forecast of future solar radiation resources;
        (ii) a means for calculating a run time load of the lighting means and heating means based on the forecast future solar radiation; and
        (iii) a means for transmitting on and off orders to the remotely located sign system to selectively engage and disengage said lighting means, said heating means, or both said lighting and heating means in accordance with the remotely calculated run time loads.

2. A sign system as set forth in claim 1 wherein said lighting means are mounted along a periphery of the frame.

3. A sign system as set forth in claim 1 further comprising at least one mast integrated with said frame and configured to receive mounting structures to align and hold said photovoltaic solar modules.

4. A sign system as set forth in claim 3 wherein said mast comprises vertically installed pipes or tubes of a sufficient size and strength to provide a secure and useful mounting mast for solar modules.

5. A sign system as set forth in claim 3 wherein said photovoltaic module mounts are configured to securely anchor said module to the sign frame and provide for proper module orientation for solar energy collection.

6. A sign system as set forth in claim 5 wherein said photovoltaic module mounts further comprises a main dorsal tube which slides snuggly over the mounting masts allowing for secure anchoring of the module, thereby providing an ability to slew about the vertical mast in order to achieve proper azimuth orientation.

7. A sign system as set forth in claim 1 wherein said tensioning means further comprises:
   (a) a flexible, sheet-like material with a retaining means extending around its peripheral edges; and
   (b) a plurality of spring means fastened to a generally planar support surface and arranged along all opposite edges of the flexible, sheet-like material, each spring means engaging the retaining means and providing selective tensioning of the flexible sheet-like material by the nature of the spring means.

8. A sign system as set forth in claim 1 wherein said heating means comprises a collector of solar radiation and a means of transferring collected solar heat to desired locations.

9. A sign system as set forth in claim 8 wherein said collector and transfer means comprise a solar collector for receiving solar radiation, a heat pipe assembly for storing and transporting solar heat, and a servo valve assembly and control for releasing stored solar heat to desired locations at desired times.

10. A sign system as set forth in claim 1 wherein said future solar radiation resource determination means comprises an electronic solar radiation forecasting service configured to supply automated solar radiation forecast data to said calculating means.

11. A sign system as set forth in claim 1 where said calculation means comprises a computer software program configured to determine load run times based on a combination of system use history, future solar radiation, and user preferences.

12. A computer executed method of controlling a lighted sign comprising:
   (a) determining, by a remotely located computer, a forecast of future solar radiation resource for a location of a sign system wherein said sign system is equipped with solar-powered lighting and solar heating of the lamps of said solar-powered lighting, said lighting and heating being remotely controllable from the remotely located computer;
   (b) calculating, by the remotely located computer, at least one load run time for said solar heating and solar-powered lighting based upon said forecast of solar radiation resource; and
   (c) independently controlling said lighting and heating to achieve said calculated load run time by remotely transmitting at least one ON order and at least one OFF order to said solar heating and solar-powered lighting from the remotely located computer.

13. The method as set forth in claim 12 wherein said step of determining a forecast comprises receiving at least one forecast from an electronic forecasting service.

14. The method as set forth in claim 12 wherein said steps of determining, calculating and controlling are performed responsive to a revenue contract with an owner of said sign system.

15. The method as set forth in claim 12 wherein said step of transmitting orders comprises transmitting orders over a wireless transmission medium.

16. The method as set forth in claim 15 wherein said wireless transmission medium comprises a cellular telephone medium.

17. The method as set forth in claim 12 wherein said step of transmitting orders comprises transmitting orders over a wired transmission medium.

18. The method as set forth in claim 17 wherein said wired transmission medium comprises a telephone medium.

19. The method as set forth in claim 17 wherein said wired transmission medium comprises an Internet medium.

* * * * *